(12) United States Patent
Albright

(10) Patent No.: US 8,434,029 B2
(45) Date of Patent: Apr. 30, 2013

(54) SYSTEMS AND METHODS FOR PROVIDING INFORMATION PERTAINING TO PHYSICAL INFRASTRUCTURE OF A BUILDING OR PROPERTY

(75) Inventor: James Albright, Hudsonville, MI (US)

(73) Assignee: Albright Insights, Inc., Hudsonville, MI (US)

( * ) Notice: Subject to any disclaimer, the term of this patent is extended or adjusted under 35 U.S.C. 154(b) by 0 days.

(21) Appl. No.: 13/213,152

(22) Filed: Aug. 19, 2011

(65) Prior Publication Data

US 2013/0047120 A1    Feb. 21, 2013

(51) Int. Cl.
*G06F 3/00*    (2006.01)

(52) U.S. Cl.
USPC ............ 715/865; 715/810; 715/854; 701/409

(58) Field of Classification Search .................... 715/853
See application file for complete search history.

(56) References Cited

U.S. PATENT DOCUMENTS

| | | | |
|---|---|---|---|
| 5,386,360 A * | 1/1995 | Wilson et al. .................... 700/17 |
| 6,907,300 B2 * | 6/2005 | O'Mahoney et al. ........... 700/17 |
| 7,044,372 B2 * | 5/2006 | Okuda et al. ................... 235/384 |
| 7,197,514 B2 * | 3/2007 | Boros et al. ............................ 1/1 |
| 7,634,737 B2 * | 12/2009 | Beringer et al. .............. 715/764 |
| 8,010,906 B1 * | 8/2011 | Sinnard et al. ................. 715/771 |
| 2002/0010522 A1 * | 1/2002 | Martin ............................ 700/97 |
| 2003/0097240 A1 * | 5/2003 | Atasoy .............................. 703/1 |
| 2004/0103431 A1 * | 5/2004 | Davenport et al. ............. 725/33 |
| 2010/0036599 A1 * | 2/2010 | Froeberg et al. .............. 701/200 |
| 2010/0125478 A1 * | 5/2010 | Bisht ................................. 705/8 |
| 2012/0066215 A1 * | 3/2012 | Gerstner et al. .............. 707/723 |

* cited by examiner

*Primary Examiner* — Alvin Tan

(74) *Attorney, Agent, or Firm* — Barnes & Thornburg, LLP

(57) ABSTRACT

A computer implemented system and method for displaying information pertaining to physical infrastructure in a building or on a property via a mobile software application operating or a mobile device are provided. The mobile software application includes steps of (a) optionally displaying a list of selectable buildings and/or areas at a property, (b) optionally displaying a list of selectable floors if a building having multiple floors is selected, (c) displaying a list of points of interest for the selected floor, building or area, and (d) displaying a floor plan or area map with selected points of interest highlighted.

6 Claims, 4 Drawing Sheets

SYSTEMS AND METHODS FOR PROVIDING INFORMATION PERTAINING TO PHYSICAL INFRASTRUCTURE OF A BUILDING OR PROPERTY

FIELD OF THE INVENTION

This invention relates to systems and methods for providing information pertaining to physical infrastructure of a building or property, including the location and attributes of facilities such as restrooms, entrances and elevators.

BACKGROUND OF THE INVENTION

Buildings and/or properties often have directories that provide some general information pertaining to the location of particular types of physical infrastructure, such as the location of restrooms, stairs, elevators, dining facilities, etc. However, such directories are usually located only at selected locations, such as the main entrance or main lobby. Such directions are not portable and are not capable of providing detailed information.

Known mobile devices (e.g., smart phones and/or tablet computers) have applications that provide directions (e.g., driving instructions) on how to travel from one location or address to another location or address. However, these applications do not provide information relating to the infrastructure of a building or property at a particular location, and do not provide details regarding the physical infrastructure in a building or at a location.

BRIEF SUMMARY OF THE INVENTION

Methods and systems are provided for retrieving and displaying information pertaining to physical infrastructure in a building or complex via a mobile software application operating on a mobile device (e.g., a smart phone, tablet computer or the like).

A computer implemented method for displaying information pertaining to physical infrastructure of interest to a user in a building or at a property includes: (a) optionally displaying a selection of buildings and/or areas of a property for user selection; (b) optionally displaying a selection of floors for a building having multiple floor levels; (c) displaying a list of points of interest for a selected floor of a building having multiple floor levels, a selected building having only a single floor level, or a selected area; and (d) displaying a floor plan or area map with the selected points of interest highlighted. In certain cases, the floor plan or area map highlighting the selected points of interest will provide sufficient information to allow the user to navigate to the desired point of interest. In certain other cases, the user may desire detailed information concerning the selected point of interest. In such case, a particular highlighted point of interest may be selected to display detailed textual and/or graphical information pertaining to the selected point of interest.

A system for displaying information pertaining to physical infrastructure of interest to a user in a building or at a property includes a display, a user interface, a processing device, and a memory for storing instructions executable by the processing device to (a) optionally display a selection of buildings and/or areas of a property for user selection, (b) optionally display a selection of floors of a building having multiple floor levels, (c) display a list of points of interest for a floor of a building having multiple floors, a selected building having a single floor level, or the selected area, and (d) displaying a floor plan or area map with the selected points of interest highlighted. At the user's option, a particular highlighted point of interest may be selected to display detailed textual information pertaining to that point of interest.

Further details and various features, objects and advantages of the invention are provided in the description of the preferred embodiments, the drawings and claims.

DETAILED DESCRIPTION OF PREFERRED EMBODIMENTS

The computer-implemented methods and systems of the invention described herein may be used by generally any person that is interested in finding particular points of interest in a building or at a property, such as restrooms, telephones, ATM's, fire alarms, changing stations, assistance, parking, dining, first aid and/or other emergency services, stairs, elevators, etc. However, the systems and methods of this invention were developed for, and will be especially beneficially employed by, individuals having disabilities, with relevant points of interest including wheelchair ramps, parking for the disabled, and wheelchair accessible restrooms. However, because different disabilities require different needs, detailed information regarding physical characteristics or attributes of points of interest are preferably provided in certain embodiments of the systems and methods of the invention disclosed herein. Such information includes dimensions of restroom stalls, the height of sinks, wheelchair accessibility to facilities, such as sinks, including under sink clearance and reachability of faucets and/or valves for controlling running water to sinks, the height of elevator push buttons, the dimensions of elevators, etc.

Figure 1:
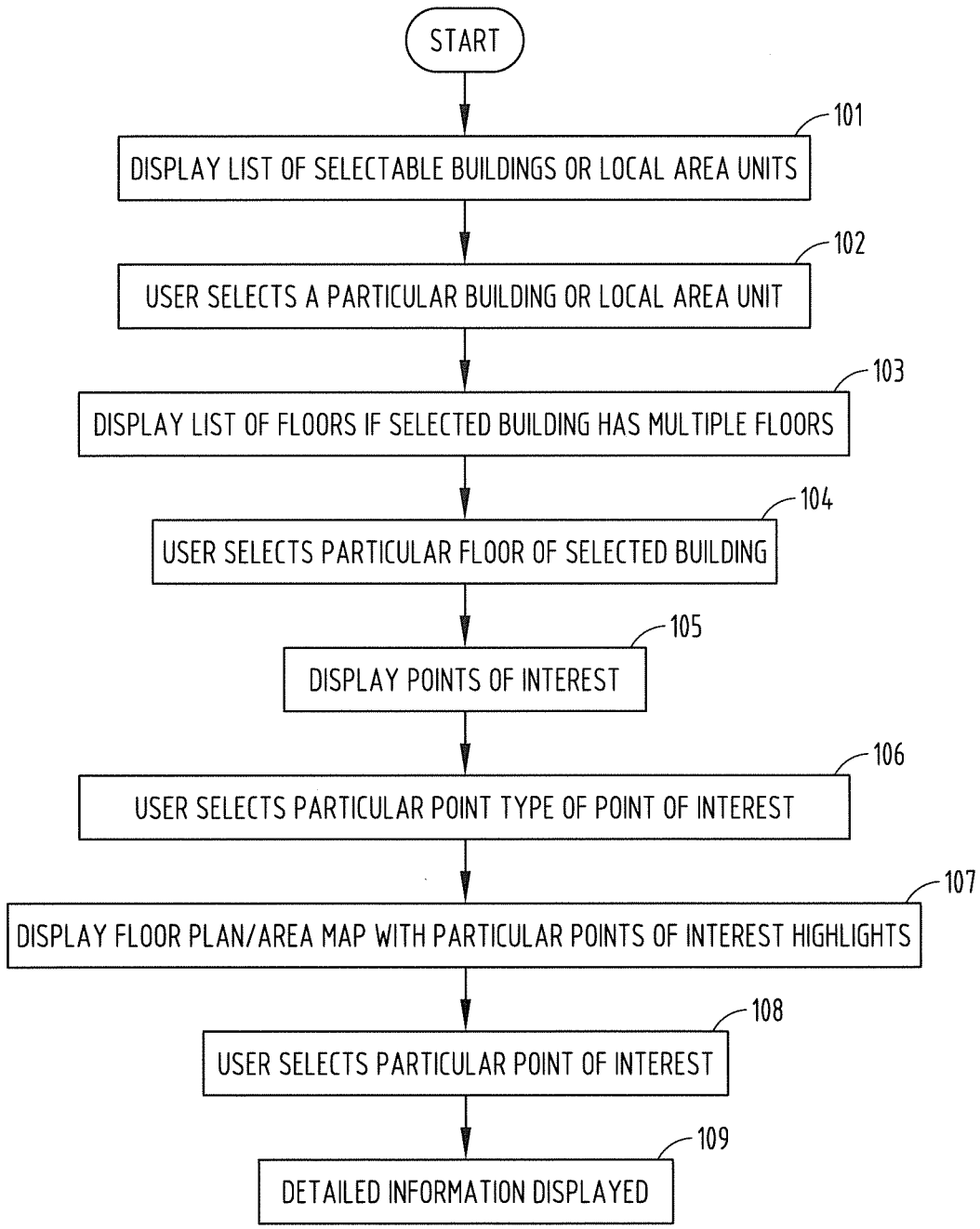
FIG. 1 is a flow diagram showing the steps for a computer implemented method for displaying information pertaining to physical infrastructure of a building or property.

FIG. 1 is a flow diagram illustrating how the computer implemented methods and systems of the invention may interact with a user desiring information regarding points of interest in a building or at a property. In certain cases, the method may be limited to a particular building or property. In other cases, the method may involve a property having multiple buildings and/or areas. In such case, the method includes a step 101 of displaying a list of selectable buildings and/or areas of a property. For example, a list of buildings at a university or college campus, a list of buildings at a research facility or other complex, or a list of buildings at a government facility. The listing may also include structures or areas that are not buildings. For example, a large amusement park may include a combination of buildings that may be listed, and amusements that may not be regarded as buildings, such as roller coasters and other amusement rides. In the event that the methods and systems of this invention are used for a single building, this first step of displaying a list of selectable buildings and/or areas of a property may be omitted.

It is also envisioned that in certain embodiments, the methods and systems of this invention will not be limited to particular buildings or properties, but may instead be used to acquire infrastructure information about a variety of different buildings and/or properties. In such cases, the user may be able to select a particular building or property from a list, by inputting an address or coordinates, by pointing to a map display having pan and zoom features, or from a list generated based on GPS data.

The user may then execute step 102 of selecting a particular building or area of a property. Thereafter, the methods and systems of this invention implement a step 103 of displaying a list of floors in the event that a building having multiple floors is selected. Otherwise, step 105 is implemented and steps 103 and 104 are skipped. The user may take step 104 of selecting a particular floor of interest in the selected building. Thereafter, in step 105, available points of interest at a selected, single level building, floor of a multiple level building, or area of a property are displayed. The user may then select a particular category or type of point of interest, as indicated in box 106. Thereafter, in step 107 a floor plan or area map is displayed with the selected point of interest or the selected points of interest highlighted. For a particularly selected category of points of interest, a single point of interest or multiple points of interest may be available. For example, a single floor level of a building may have multiple restrooms, all of which would be highlighted, such as in a different color. Often, the map or floor plan highlighting the location of selected points of interest provides sufficient information to allow the user to navigate to the desired point of interest. In other cases, the user may select a particular point of interest out of a plurality of displayed points of interests (step 108) for additional detailed information that may be displayed in either a textual format, in a graphical format, or in a combination of both (step 109).

Figure 2:
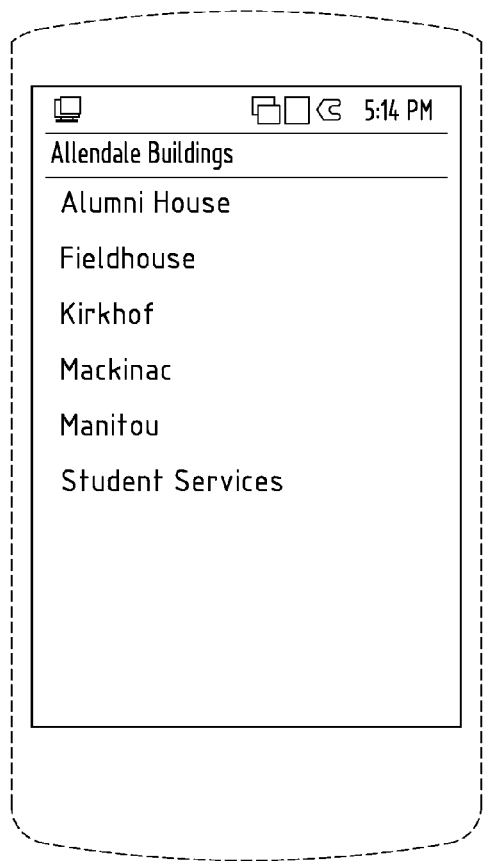
FIG. 2 is a screen shot of a display showing an example of buildings that can be selected at a particular property, such as a college campus.
Figure 3:
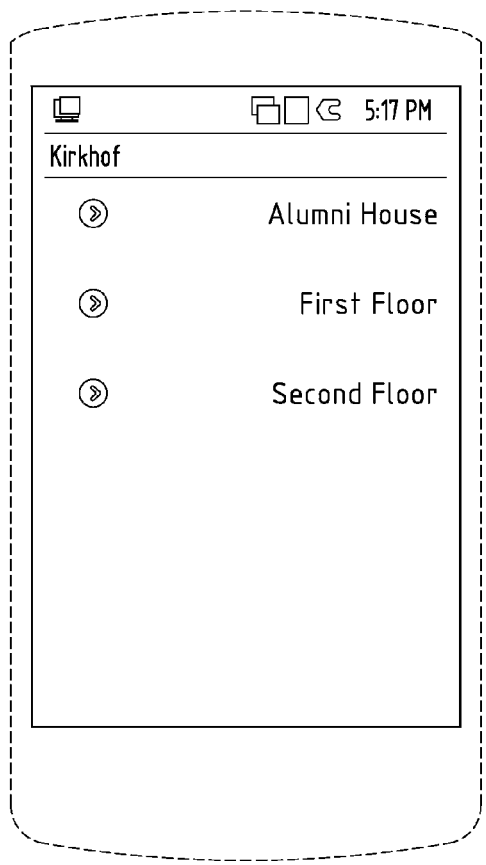
FIG. 3 is a screen shot of a display of floor levels that can be selected for a particular building that has been selected from the display of FIG. 2.
Figure 4:
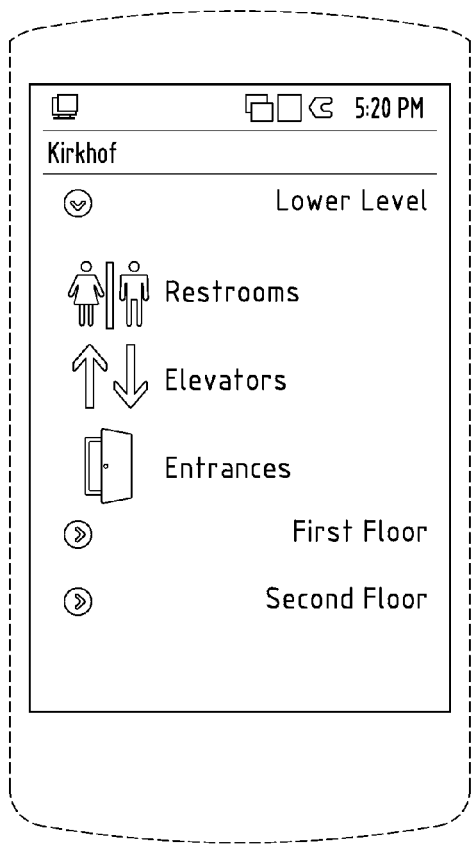
FIG. 4 is a screen shot of an example of points of interest for a particular floor selected from the screen shot of FIG. 3.
Figure 5:
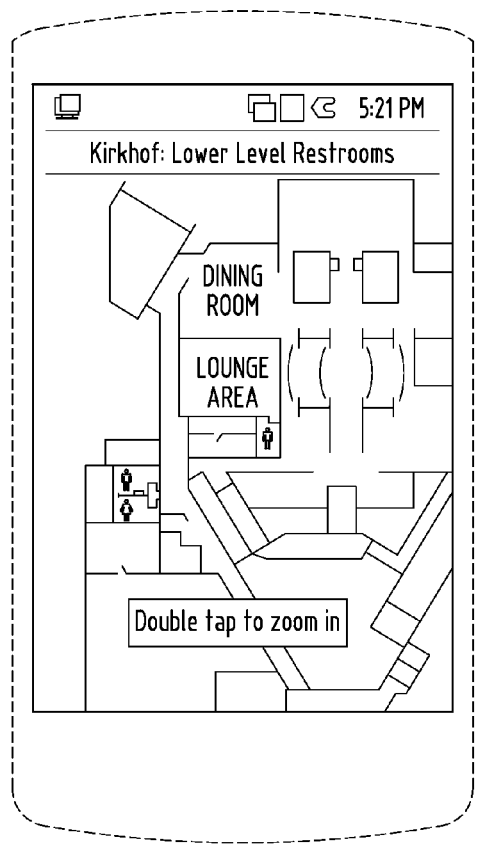
FIG. 5 is a screen shot of a floor plan selected from FIG. 3, with the points of interest selected from FIG. 4 highlighted.
Figure 6:
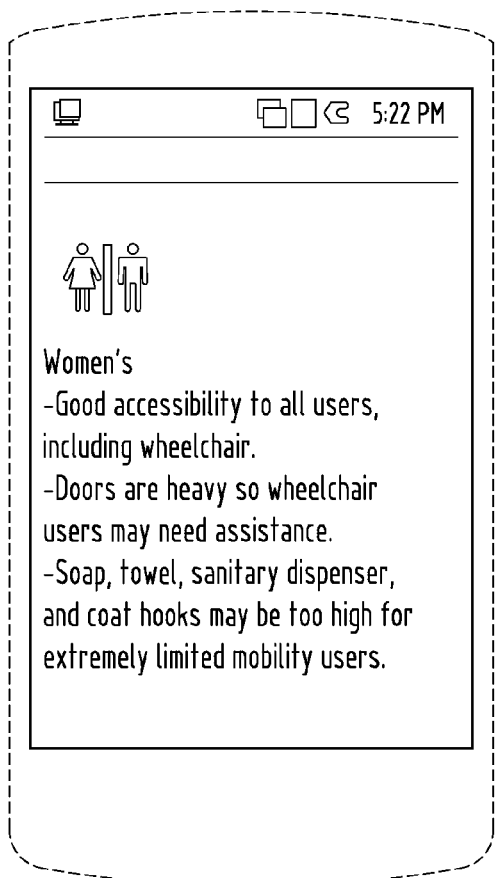
FIG. 6 is a screen shot showing detailed textual information regarding a particular point of interest selected from the floor plan shown in FIG. 5.

FIG. 2 shows a particular example in which the buildings at a college campus are listed. The user may select, through a user interface, such as a touch screen display, the particular building of interest. In the illustrated example, the user selects the Kirkhof building. In this case, three floor levels are available as illustrated in FIG. 3. In the example, the user is on the lower level and selects the lower level from the screen illustrated in FIG. 3. In this example, catalogued points of interest for the lower level of the Kirkhof building include restrooms, elevators and entrances as shown in FIG. 4. In the illustrated example, the user is interested in determining the location of restrooms on the lower level of the Kirkhof building and therefore selects restrooms in FIG. 4. Thereafter, a floor plan for the lower level of the Kirkhof building is displayed with the restrooms highlighted, such as in a different color. In this illustrated example, the user selects the woman's restroom, such as by touching the touch screen display where the woman's restroom is illustrated. Thereafter, detailed information regarding the restroom is displayed as illustrated in FIG. 6.

Figure 7:
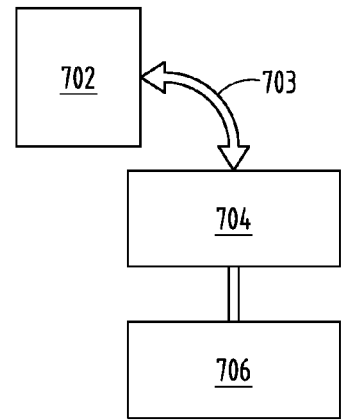
FIG. 7 is a schematic diagram showing a system and process for displaying information pertaining to physical infrastructure in a building or at a property via a mobile software application operating on a portable device (e.g., a smart phone, tablet computer, or the like).
Figure 8:
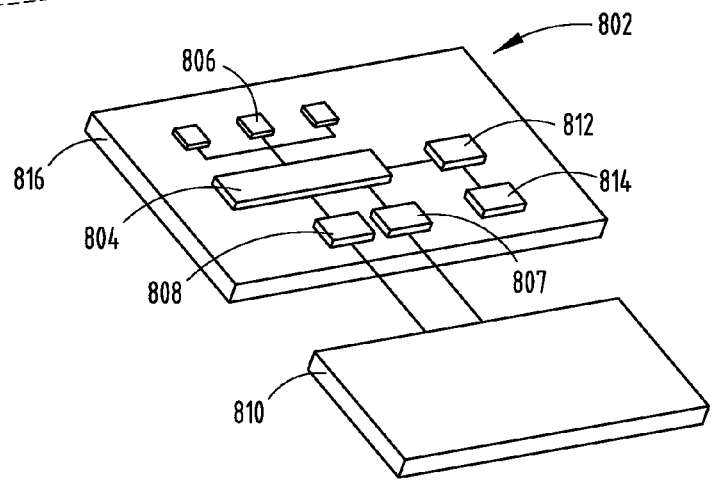
FIG. 8 is a diagram of a portable computing device that may be used to implement the systems and methods described herein.

Generally, the memory on a smart phone is not sufficient to store all of the floor plans and/or maps and details regarding points of interest in all the buildings and/or areas of a property, such as a college campus, research facility or amusement park. Accordingly, as illustrated in FIG. 7, the systems and processes of this invention may include a mobile device 702, which may be a smart phone, tablet computer, or other portable device having a processor, a display, and a suitable user interface (e.g., a touchpad screen), including means for wireless communication (indicated by arrow 703) with a network 704 connected with servers 706 for storing the lists of buildings, areas, floor plans, area maps, points of interest, and detailed information described above. The wireless communication can be via a local area network, a wide area network or mobile internet access (e.g., third or fourth generation mobile telecommunications).

Mobile device 702 includes computing device 802 having a processor 804 that may communicate with a user through a control interface 808 and display interface 807 coupled to a display 810. Display 810 can be a thin film transistor liquid crystal display or an organic light emitting diode display or other suitable display. Display interface 807 may comprise appropriate circuitry for driving the display 810 to present graphical and textual information to a user. The controlled interface 807 may receive commands from a user and convert them for submission to processor 804. Computing device 802 may also include memory 806, a communications interface 812 and a receiver 814, among other components. Each of the components may be interconnected using busses, and the components may be mounted on a common motherboard 816.

Memory 806 stores information within computing device 802, and can be implemented as one or more of a computer-readable medium or media, a volatile memory unit or units, or a non-volatile memory unit or units. Additionally, expansion memory may be provided and connected such as through an expansion interface.

In certain embodiments, a computer program containing instructions that, when executed, perform one or more methods, as described above, is tangibly embodied in memory 806, or expansion memory, or is a propagated signal that may be received over transmitter 814.

Device 802 may communicate wirelessly through communication interface 814, which may include digital signal processing circuitry when necessary, under various modes or protocols, such as GSM voice calls, SMS, EMS, or MMS messaging, CDMA, TDMA, PDC, WCDMA, CDMA 2000, or GPRS, among others.

Desirably, in certain embodiments, the systems and methods disclosed herein employ an appropriate combination of user interfaces and software commands that facilitate interaction with the maps and/or floor plans displayed, including zooming and panning of the map and/or floor plan.

The invention has been described with reference to the preferred embodiments. Of course, modifications and alterations will occur to others upon reading and understanding the preceding description. It is intended that the invention be construed as including all such modifications and alterations insofar as they come within the scope of the appended claims.

What is claimed is:

1. A computer implemented system for displaying information pertaining to physical infrastructure in a building or on a property via a mobile software application operating on a mobile device, comprising:

the mobile device operating the mobile software application for retrieving data from a memory and having a user interface and a display, wherein the mobile software application includes machine executable instructions for performing the steps of:

(a) displaying a vertical listing comprising areas at a property and user-selectable buildings having at least one building with multiple floors, (b) in response to a user selecting one of the at least one building with multiple floors, displaying a listing of floor levels of the selected building, (c) in response to the user selecting one of the floor levels of the selected building, displaying immediately below the selected floor level, a list of categories of points of interest for the selected floor level, (d) in response to the user selecting one of the categories of points of interests in the list, displaying a floor plan or area map with points of interests belonging to the selected category of points of interests highlighted in different colors, such that text indicating the selected building, selected floor level, and selected category of points of interests is displayed with the floor plan or area map, and (e) in response to the user selecting one of the highlighted points of interests on the floor plan or area map, displaying dimensions of the selected point of interest with user information regarding details of the selected point of interest's handicapped accessibility for allowing persons to determine if they can maneuver a wheelchair within the selected point of interest.

2. The system of claim 1, further comprising a wireless communications system for receiving data from a remotely located server.

3. A computer implemented system as in claim 1, wherein the selected point of interest includes at least one of a restroom, elevator or entrance.

4. A computer implemented method for displaying information pertaining to physical infrastructure in a building or at a property via a mobile software application operating on a mobile device, comprising:

(a) displaying a vertical listing comprising areas at a property and user-selectable buildings having at least one building with multiple floors, (b) in response to a user selecting one of the at least one building with multiple floors, displaying a listing of floor levels of the selected building, (c) in response to the user selecting one of the floor levels of the selected building, displaying immediately below the selected floor level, a list of categories of points of interest for the selected floor level, (d) in response to the user selecting one of the categories of points of interests in the list, displaying a floor plan or area map with points of interests belonging to the selected category of points of interests highlighted in different colors, such that text indicating the selected building, selected floor level, and selected category of points of interests is displayed with the floor plan or area map, and (e) in response to the user selecting one of the highlighted points of interests on the floor plan or area map, displaying dimensions of the selected point of interest with user information regarding details of the selected point of interest's handicapped accessibility for allowing persons to determine if they can maneuver a wheelchair within the selected point of interest.

5. The method of claim 4, further comprising a wireless communications system for receiving data from a remotely located server.

6. A computer implemented method as in claim 4, wherein the selected point of interest includes at least one of a restroom, elevator or entrance.

\* \* \* \* \*